United States Patent
Beller et al.

(10) Patent No.: US 11,361,229 B2
(45) Date of Patent: Jun. 14, 2022

(54) POST-PROCESSOR FOR FACTOID ANSWER CONVERSIONS INTO STRUCTURED RELATIONS IN A KNOWLEDGE BASE

(71) Applicant: INTERNATIONAL BUSINESS MACHINES CORPORATION, Armonk, NY (US)

(72) Inventors: Charles E. Beller, Baltimore, MD (US); Paul J. Chase, Jr., Fairfax, VA (US); Richard L. Darden, Leesburg, VA (US); Michael Drzewucki, Woodbridge, VA (US); Edward G. Katz, Washington, DC (US); Christopher Phipps, Arlington, VA (US)

(73) Assignee: International Business Machines Corporation, Armonk, NY (US)

( * ) Notice: Subject to any disclaimer, the term of this patent is extended or adjusted under 35 U.S.C. 154(b) by 931 days.

(21) Appl. No.: 15/657,936

(22) Filed: Jul. 24, 2017

(65) Prior Publication Data
US 2019/0026633 A1    Jan. 24, 2019

(51) Int. Cl.
*G06N 5/02* (2006.01)
*G06N 7/00* (2006.01)
(Continued)

(52) U.S. Cl.
CPC .......... *G06N 5/025* (2013.01); *G06F 16/245* (2019.01); *G06F 16/90332* (2019.01); *G06N 7/005* (2013.01)

(58) Field of Classification Search
CPC .............................. G06N 5/025; G06F 15/245
See application file for complete search history.

(56) References Cited

U.S. PATENT DOCUMENTS 6,629,097 B1    9/2003  Keith
8,738,365 B2    3/2014  Ferrucci et al.
(Continued)

FOREIGN PATENT DOCUMENTS

JP    2015109068 A    6/2015

OTHER PUBLICATIONS

Anonymous, "Method of Computing Relevancy Score in a Question and Answering System," An IP.com Prior Art Database Technical Disclosure, Oct. 2, 2012, p. 1-3, IP.com No. IPCOM000222407D.
(Continued)

*Primary Examiner* — Kevin W Figueroa
(74) *Attorney, Agent, or Firm* — Robert R. Aragona

(57) ABSTRACT

A method, computer system, and a computer program product for converting a plurality of factoid answers into a plurality of structured relations for storage in a structured knowledge base is provided. The present invention may include receiving a query from a user. The present invention may also include generating a plurality of possible factoid answers. The present invention may then include determining a plurality of confidence scores for the plurality of possible factoid answers. The present invention may then include generating a plurality of certain factoid answers from the plurality of possible factoid answers. The present invention may then include identifying a plurality of special target items. The present invention may further include generating a plurality of structured relations for each certain factoid answer and the identified plurality of special target items. The present include may also include storing the generated plurality of structured relations into the structured knowledge base.

20 Claims, 5 Drawing Sheets

(51) Int. Cl.
*G06F 16/245* (2019.01)
*G06F 16/9032* (2019.01)

(56) References Cited

U.S. PATENT DOCUMENTS

| | | | |
|---|---|---|---|
| 9,299,024 | B2 | 3/2016 | Bagchi et al. |
| 9,400,841 | B2 | 7/2016 | Eggebraaten et al. |
| 2013/0029307 | A1* | 1/2013 | Ni .......................... G06N 20/00 434/322 |
| 2013/0177893 | A1* | 7/2013 | Feng ................... G06F 16/3329 434/322 |
| 2014/0164304 | A1* | 6/2014 | Bagchi ..................... G06N 5/02 706/46 |
| 2014/0280307 | A1 | 9/2014 | Gupta et al. |
| 2015/0356463 | A1 | 12/2015 | Overell et al. |
| 2016/0132590 | A1 | 5/2016 | Byron et al. |
| 2016/0335261 | A1* | 11/2016 | Salvetti ............... G06F 16/2455 |
| 2017/0351962 | A1* | 12/2017 | Appel .................... G06N 7/005 |
| 2018/0157960 | A1* | 6/2018 | Holmes ............. G06F 16/24522 |
| 2018/0307687 | A1* | 10/2018 | Natkin .............. G06F 16/24578 |

OTHER PUBLICATIONS

Anonymous, "A Method and System to Use Question Answering Engine to Improve Information Extraction," An IP.com Prior Art Database Technical Disclosure, Nov. 26, 2013, p. 1-4, IP.com No. IPCOM000233160D.

Anonymous, "Improving User Feedback In A Question Answering System For Indirect Answers," An IP.com Prior Art Database Technical Disclosure, Oct. 1, 2014, p. 1-3, IP.com No. IPCOM000239021D.

Anonymous, "Improving Question Answering Systems with Predefined Question Answer Stores," An IP.com Prior Art Database Technical Disclosure, Mar. 4, 2015, p. 1-4, IP.com No. IPCOM000240815D.

Anonymous, "A Self-Diagnosing Question Answering System," An IP.com Prior Art Database Technical Disclosure, Aug. 17, 2016, p. 1-5, IP.com No. IPCOM000247244D.

IBM, "A System & Method to Identify Correct Candidates for Question Answering over Structured Knowledge," An IP.com Prior Art Database Technical Disclosure, Mar. 16, 2009, p. 1-3, IP.com No. IPCOM000180748D.

Jurafsky et al., "Question Answering," Speech and Language Processing, Draft of Nov. 7, 2016, p. 1-19, Chapter 28.

Mell et al., "The NIST Definition of Cloud Computing," National Institute of Standards and Technology, Sep. 2011, p. 1-3, Special Publication 800-145.

Nucci, "How to Build a Knowledge Base for your Growing Team (Without Even Realizing It)," Guru Blog, Dec. 9, 2015, p. 1-3, Guru Technologies Inc., https://blog.getguru.com/how-to-build-a-knowledge-base-for-your-growing-team-without-even-realizing-it, Accessed on May 25, 2017.

Resnik, "Using Information Content to Evaluate Semantic Similarity in a Taxonomy," Proceedings of IJCAI-95, Nov. 29, 1995, 6 Pages.

Sondhi et al., "Mining Semi-Structured Online Knowledge Bases to Answer Natural Language Questions on Community QA Websites," CIKM'14, Nov. 3-7, 2014, 10 Pages, ACM, Shanghai, China.

Yao et al., "Information Extraction over Structured Data: Question Answering with Freebase," Proceedings of the 52nd Annual Meeting of the Association for Computational Linguistics, Jun. 23-25, 2014, p. 956-966, Baltimore, Maryland, USA.

* cited by examiner

POST-PROCESSOR FOR FACTOID ANSWER CONVERSIONS INTO STRUCTURED RELATIONS IN A KNOWLEDGE BASE

STATEMENT REGARDING FEDERALLY SPONSORED RESEARCH OR DEVELOPMENT

This invention was made with Government support. The Government has certain rights in this invention.

BACKGROUND

The present invention relates generally to the field of computing, and more particularly to computational linguistics.

In deep question answering systems (QA systems), factoid queries are posed to the system and large numbers of possible factoid answers are generated from unstructured text passages using a wide array of methods called answer generators. The possible factoid answers are then passed into a scoring and ranking module where they are ranked by confidence scores. Since the methods are so diverse, and largely rule-based, valuable information related to the queries may be discovered. The valuable information, however, is discarded by many QA systems after the user obtains an answer to the query.

SUMMARY

Embodiments of the present invention disclose a method, computer system, and a computer program product for converting a plurality of factoid answers into a plurality of structured relations for storage in a structured knowledge base. The present invention may include receiving a query from a user. The present invention may also include generating a plurality of possible factoid answers using an answer generator based on the received query. The present invention may then include determining a plurality of confidence scores for the generated plurality of possible factoid answers using an answer scoring and ranking module. The present invention may then include generating a plurality of certain factoid answers based on the generated plurality of possible factoid answers. The present invention may then include identifying a plurality of special target items based on the received query. The present invention may further include generating a plurality of structured relations for each certain factoid answer and the identified plurality of special target items. The present include may also include storing the generated plurality of structured relations into the structured knowledge base.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
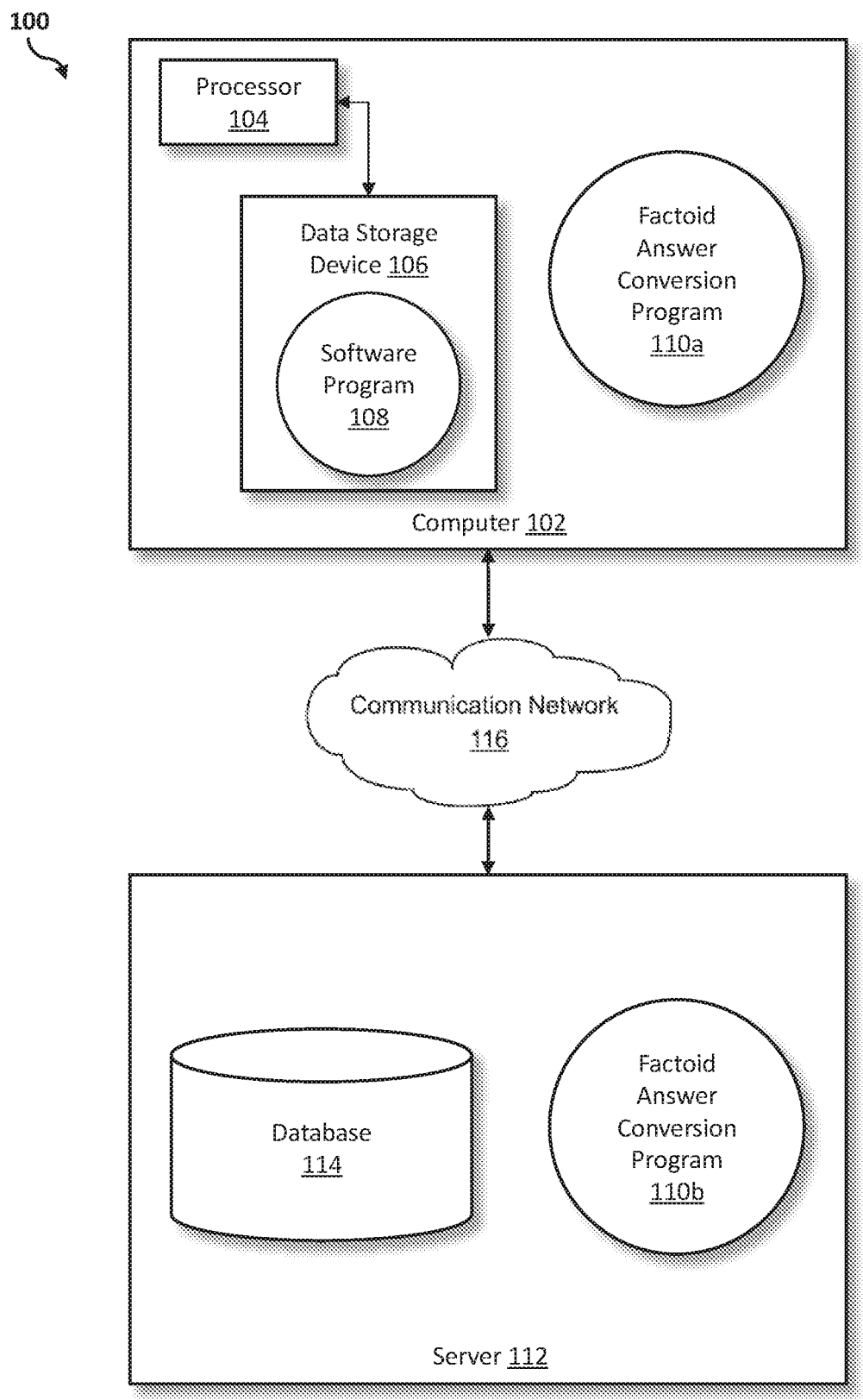
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for converting factoid answers into structured relations in a structured knowledge base. As such, the present embodiment has the capacity to improve the technical field of computational linguistics by utilizing a natural language query generated by a user to create new knowledge base entries based on correlating answers in relation with elements of the query. More specifically, the factoid answer conversion program may receive a query by a user. The factoid answer conversion program may enter the received query into an answer generator, which may generate a list of possible factoid answers to the received query. The possible factoid answers may then be entered into an answer scoring and ranking module, which may generate a confidence score for each of the possible factoid answers and may rank each possible factoid answer based on the associated confidence score. The special target items may be identified from the received query, and certain factoid answers may be correlated with the special target items to create a structured relation. Then, the structured relation between certain factoid answers and the special target items may be stored in the structured knowledge base.

As described previously, in deep QA systems, factoid queries are posed to the system and large numbers of possible factoid answers are generated from unstructured text passages using a wide array of methods called answer generators (e.g., Watson Discovery Advisor™, Watson Discovery Advisor and all Watson Discovery Advisor-based trademarks and logos are trademarks or registered trademarks of International Business Machines Corporation and/or its affiliates). The possible factoid answers are then passed into an answer scoring and ranking module where they are ranked by confidence scores. Since the methods are so diverse, varied and largely rule-based, additional valuable information related to the queries, and not the specific answer returned, may be discovered. The valuable information is then discarded by many QA systems after the user obtains an answer to the query.

A well-tuned domain adapted version of a QA system may produce highly relevant answers when the confidence rank is above certain thresholds. Often there may be multiple relevant answers in different surface forms on the list of possible factoid answers. These relevant answers, however, may be discarded at run time and knowledge may be lost. If a new user asks the same query that a previous user asked, the query may be treated as a unique query, rather than a re-query. The value of having already obtained one or more relevant answers to that query may not be taken into account.

Therefore, it may be advantageous to, among other things, provide a method, computer system or computer program product for converting factoid answers generated in the normal process of a QA system and utilizing the confidence scores and semantic relationships to query terms to generate structured relations to be stored in a structured knowledge base for future queries.

According to at least one embodiment, the factoid answer conversion program may include a rule-based system to extract answers to queries, and then store the relations of the query terms in the structured knowledge base. The queries are received from a user and the answers are generated by multiple known answer generators. The factoid answer conversion program may also obtain extracted answers to queries even if the extracted answer is located in a different passage or document from the query. Additionally, the relations between the retrieved disconnected bits of unstructured texts may be unpredictable ahead of time and may possess an unintended side effect of factoid question answering. Once the unstructured texts are converted into structured texts, the information may be stored in the knowledge base for future queries.

According to at least one embodiment, the factoid answer conversion program may create a relation by associating each certain factoid answer (i.e., high-confidence factoid answer) with each keyword from a sentence and placing a label on that relation based on the answer generator that retrieved the certain factoid answer. For example, in answering the query, Where was the film Stagecoach first released?, the answer generator may find the date 1939 as a possible answer with a confidence of 67.85%. This is an incorrect answer to the query. The year 1939, however, is when the film Stagecoach was released. As such, there may be a semantically reasonable relation between Stagecoach and 1939. Even though the information related to the released date of the film is irrelevant for this specific query, the factoid answer conversion program may store this non-specific information since this information may be relevant and useful for a future query. Since the work to discover this information has already been done, instead of discarding this information, this information may be stored for future use.

According to at least one embodiment, the factoid answer conversion program converts certain factoid answers (i.e., latent information from unstructured texts) into structured data (i.e., structured relations), and then stores the structured data in various forms (e.g., knowledge graph) in the structured knowledge base. As such, every user query may be treated as information extraction in which a self-tuning domain adaptation is created. Additionally, the knowledge base may be generated in relation to the types of queries or domain associated with the queries asked by the user, and the types of information in the corpus of the documents to which the information may be extracted from by the answer generators.

According to at least one embodiment, the user may select which of the methods the factoid answer conversion program may utilize to identify special target items in a query, such as entities in the query that are already in the knowledge base, main topic words, or Lucene content words (i.e., adding content to a full-text index).

According to another embodiment, the factoid answer conversion program may utilize several methods to correlate certain factoid answers with special target items, such as, a general relation for such discovered information, an answer generator to determine the factoid answer as the name of the relation, or slot relation names that may occur in grammatical frame structures. For example, to the query, What country donated the Statute of Liberty to the people of the United States? the answer passage generated was The Statute of Liberty was designed by the French sculptor Frédéric Auguste Bartholdi and built by Gustave Eiffel as a gift from the people of France. A QA system may generate Frederic Auguste Bartholdi as a high confidence answer, even though Frédéric Auguste Bartholdi does not answer the query. Therefore, the factoid answer conversion program may research the noun gift in another known answer generator and determine that the term Frédéric Auguste Bartholdi may have a beneficiary argument marked by gift from. Then, the factoid answer conversion program may utilize a dependency tree for the answer Frédéric Auguste Bartholdi and determine that the term Frédéric Auguste Bartholdi may be linked to gift from with the same verb as the query. Therefore, the factoid answer conversion program may create a relation between Statue of Liberty, Frédéric Auguste Bartholdi and gift from the people of France.

According to at least one embodiment, the factoid answer conversion program may be integrated into a QA system without a knowledge base. The factoid answer conversion program may create the knowledge base for the structured data generated by the QA system. Thereafter, the QA system may present answers to the user based on the special target items and confidence scores stored in the knowledge base.

According to at least one embodiment, answer generators may be utilized to generate the factoid answers to the received query. For any query, the answer generators may generate factoid answers based on the corpus of documents from publications, literature, credible online sources, or manually uploaded texts stored within the database of the answer generator. The corpus of documents may be ingested by the answer generator and text may have been extracted from the corpus documents to provide factoid answers to a query. Then, the extracted text may be stored in a database for future queries. As such, when an answer generator receives a query, the answer generator may search the database for any factoid answers to the received query that may have been previously stored in the database.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a factoid answer conversion program 110a. The networked computer environment 100 may also include a server 112 that is enabled to run a factoid answer conversion program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116.

The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the factoid answer conversion program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the factoid answer conversion program 110a, 110b (respectively) to convert factoid answers into structured relations in a knowledge base. The factoid answer conversion method is explained in more detail below with respect to FIG. 2.

Figure 2:
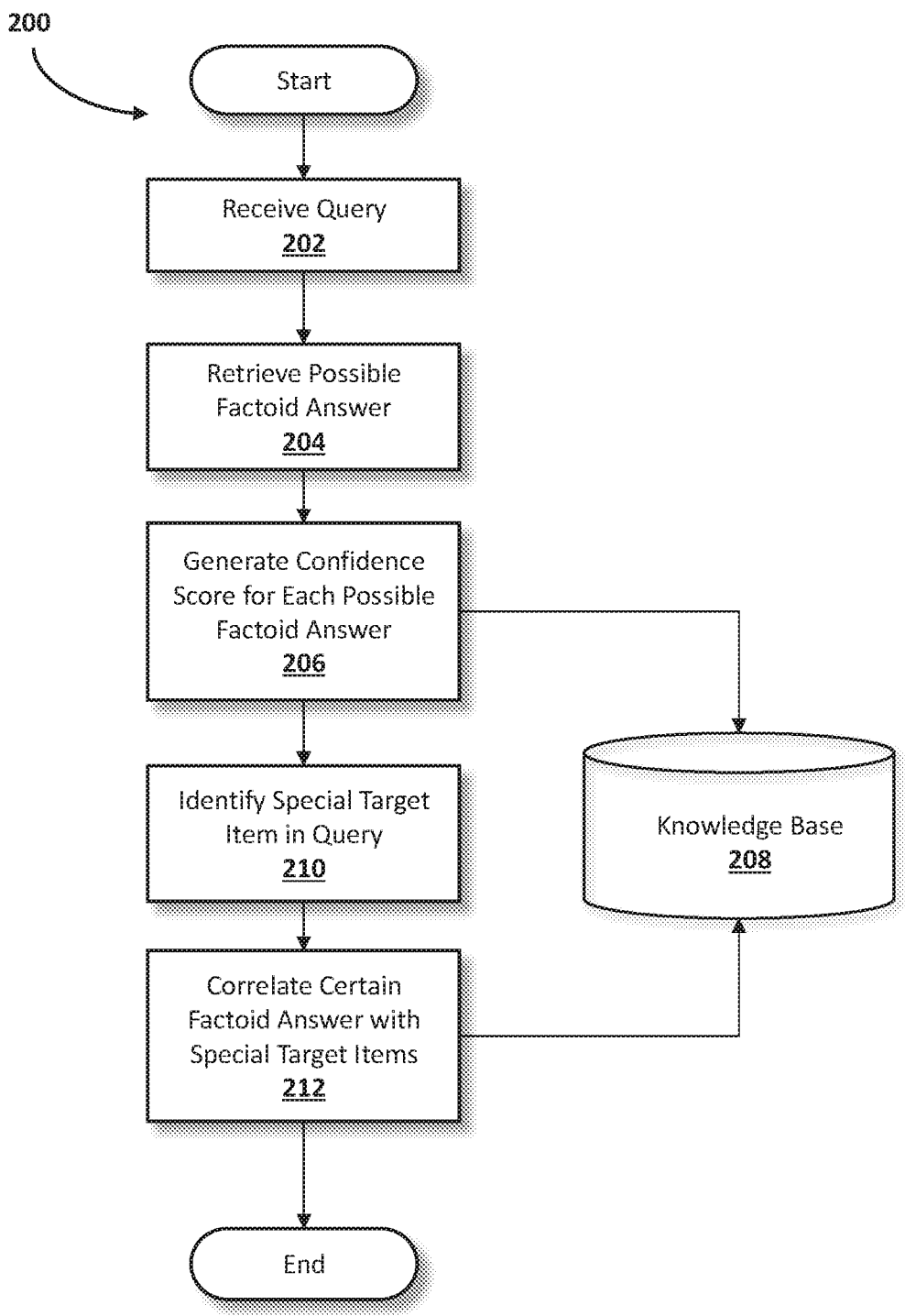
FIG. 2 is an operational flowchart illustrating a process for factoid answer conversion according to at least one embodiment.

Referring now to FIG. 2, an operational flowchart illustrating the exemplary factoid answer conversion process 200 used by the factoid answer conversion program 110a and 110b according to at least one embodiment is depicted.

At 202, the factoid answer conversion program 110a, 110b receives a query from a user. On the screen of the QA system, there may be a dialog box, for example, in which the user may enter a query. Using a software program 108 on the user's device (e.g., user's computer 102), the query may be transmitted from the QA system and received as an input into the factoid answer conversion program 110a, 110b to create new knowledge base entries based on the factoid answers that are related to the received query. The query may be in the form of a natural language query in which the user is soliciting an answer in the form of a fact (i.e., factoid answer). The query may be related to a broad range of domains.

Additionally, depending on the QA system utilized by the user, the user may enter multiple queries at one time, or in a rapid succession using an application program interface (API), which may be transmitted over the communications network 116 to the factoid answer conversion program 110a, 110b.

For example, the user enters the query who won the 2010 World Cup? as input into the dialog box associated with the QA system. The QA system then transmits the same query to factoid answer conversion program 110a, 110b. As such, the factoid answer conversion program 110a, 110b receives the following query as a text string: Who won the 2010 World Cup?

Next, at 204, the factoid answer conversion program 110a, 110b retrieves possible factoid answers to the received query. The received query may be entered as input into a known answer generator to generate as output of at least one possible factoid answer to the received query. Thereafter, the factoid answer conversion program 110a, 110b may generate a list of possible factoid answers to the received query.

Continuing the previous example, the answer generator will create the following list of possible factoid answers to the received query, who won the 2010 World Cup:
Answer 1: Spain
Answer 2: Andrés Iniesta
Answer 3: Iker Casillas
Answer 4: New Zealand
Answer 5: Kelly Brazier
Answer 6: Germany
Answer 7: Mario Götze In another embodiment, if the answer generator fails to retrieve at least one possible factoid answer to the received query 204, then the user may receive an error message. The user may then enter the same query, a variation of the same query, or a different query at 202 into the factoid answer conversion program 110a, 110b.

Then, at 206, a confidence score is generated for each possible factoid answer. After the answer generator generates a list of at least one possible factoid answer for the received query, a known answer scoring and ranking module may generate a confidence score for each of the possible factoid answers to the received query. The confidence score may range from 0%-100%, or some range that may be normalized to 0%-100%, in which a higher percentage indicates a higher possibility that the possible factoid answer may correspond with the received query. Then, the answer scoring and ranking module may rank each of the possible factoid answers for the received query based on the generated confidence scores. The factoid answer conversion program 110a, 110b may then place the generated factoid answers and corresponding confidence scores into the knowledge base 208 (i.e., database 114).

Continuing the previous example, the answer scoring and ranking module will generate the following rank and corresponding confidence score for each of the factoid answers:
Answer 1: Spain (89.7%)
Answer 2: Andrés Iniesta (85.4%)
Answer 3: Iker Casillas (70.1%)
Answer 4: New Zealand (75%)
Answer 5: Kelly Brazier (74.5%)
Answer 6: Germany (45.6%)
Answer 7: Mario Götze (38.9%)
Since no threshold confidence score was previously applied by the user, the generated possible factoid answers and corresponding confidence scores are stored in the knowledge base 208.

If, however, the user decided to implement a threshold confidence score, then the factoid answer conversion program 110a, 110b may generate a threshold confidence score based on the received query. The generated possible factoid answers that fail to satisfy the threshold confidence score may be removed from the list of possible factoid answers at 206. Only the remaining generated factoid answers (i.e., certain factoid answers) may be correlated with the special target items and stored in the knowledge base 208.

Then, at 210, a special target item (i.e., set of terms) in the received query is identified. To identify a set of special target items (i.e., noun phrases) in the received query, the factoid answer conversion program 110a, 110b may utilize semantic categories, or may decompose the received query into the identified set of special target items. The QA system may identify semantic categories (e.g., all named entities) from the received query. The factoid answer conversion program 110a, 110b may then utilize the semantic categories to identify the set of special target items (i.e., noun phrases). Alternatively, to decompose the received query, the factoid answer conversion program 110a, 110b may utilize syntactic parse (i.e., to identify grammatical components), semantic classifiers (i.e., to identify classes using taxonomy, dictionary look-up, or additional natural language processing), or lexical answer types (LAT) identification. The special target items may be derived from the decomposed query.

Continuing the previous example, only one noun phrase, 2010 World Cup, is included in the received query. Therefore, 2010 World Cup is the identified special target item for the received query, who won the 2010 World Cup?

Then, at 212, certain factoid answers are correlated with special target items. The factoid answer conversion program 110a, 110b may relate each of the special target items from the received query to certain factoid answers (i.e., high confidence factoid answers) generated by the answer generator. Each correlated factoid answer and corresponding special target items may be stored separately in the knowledge base 208 as structured relations for future queries. Additionally, an annotation as to whether the information is derived or direct (e.g., first-hand information) may be stored in the knowledge base 208. Such an annotation may determine how the information may be utilized if the information is returned in subsequent queries.

Continuing the previous example, the factoid answers (i.e., Spain, Andrés Iniesta, Iker Casillas, New Zealand, Kelly Brazier, Germany, Mario Götze) are correlated to the special target item (i.e., 2010 World Cup) and stored as structured relations in the knowledge base 208 as follows:

```
2010WorldCup_AnswerGenerator_Spain
2010WorldCup_AnswerGenerator_Andrés Iniesta
2010WorldCup_AnswerGenerator_Iker Casillas
2010WorldCup_AnswerGenerator_New Zealand
2010WorldCup_AnswerGenerator_Kelly Brazier
2010WorldCup_AnswerGenerator_Germany
2010WorldCup_AnswerGenerator_Mario Gotze
```

As such, each of the factoid answers (e.g., Spain, Andrés Iniesta, Iker Casillas, New Zealand, Kelly Brazier, Germany, Mario Götze) may be stored separately with the special target item (e.g., 2010 World Cup) in the knowledge base 208 along with an annotation that the information is derived. Additionally, regardless of whether the factoid answer is the correct factoid answer for the received query, each factoid answer is correlated with the 2010 World Cup, and may be generated for future queries related to the 2010 World Cup.

In the present embodiment, the user may determine whether to filter the possible factoid answers based on the confidence score. While the answer generator is determining the possible factoid answers to the received query, the factoid answer conversion program 110a, 110b may prompt (e.g. dialog box) the user to select to filter the possible factoid answers before the possible factoid answers are generated and ranked for the received query at 206, or determine whether a threshold confidence score may be applied in the received query by assessing the generated possible factoid answers and corresponding confidence scores after the generated possible factoid answers and corresponding confidence scores are stored in the knowledge base 208. After the user selects on the preferred option, the user may click the "Submit" button located at the bottom of the dialog box. Then, the dialog box may disappear, and the option selected by the user may be immediately implemented into the factoid answer conversion program 110a, 110b for the factoid answers generated for the received query.

If the user selects to filter the possible factoid answers before the possible factoid answers are generated and ranked for the received query at 206, then a threshold confidence score may be generated for each of the possible factoid answers from the received query. The threshold confidence score may be independently determined for each given query. At the bottom of the screen, there may be a "Threshold" button, for example, in which the user may click to change the threshold confidence score depending on the type of precision preferred for the factoid answers generated for the received query. Once the "Threshold" button is selected, a dialog box, for example, may appear in which the user may be presented with several options for the threshold confidence score (e.g., 50%, 70%, 90%). The user may select the preferred option and click on the "Submit" button located at the bottom of the dialog box. Then, the dialog box may disappear. Generated factoid answers with a confidence score below the threshold confidence score may be excluded from the list of possible factoid answers at 206, and may not be stored in the knowledge base 208.

In the present embodiment, the factoid answer conversion program 110a, 110b may become more specific based on the queries entered as input by the user. The factoid answer conversion program 110a, 110b may develop a user adapted knowledge base based on the generated queries from the user. For example, if the user only enters queries on the World Cup, then the knowledge base 208 may be generated primarily with information related to the World Cup.

In the present embodiment, the factoid answer conversion program 110a, 110b may include a knowledge graph within the knowledge base 208. The knowledge graph may be a visual expression of the information stored within the knowledge base 208 in which the special target items and the possible factoid answers may be nodes and the answer generator may be the edges or links between each of the nodes. The knowledge graph may be stored in the knowledge base 208 for the QA system to present the knowledge graph to the user.

In the present embodiment, the new knowledge base entries generated by the received query may be stored in the knowledge base 208. The QA system may then present the certain factoid answers to the received query to the user. If the QA system receives a query, at a later date, in which the factoid answer conversion program 110a, 110b already generated the certain factoid answers to the query, then the QA system may retrieve the appropriate factoid answers from the knowledge base 208 and present the appropriate factoid answers to the user.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
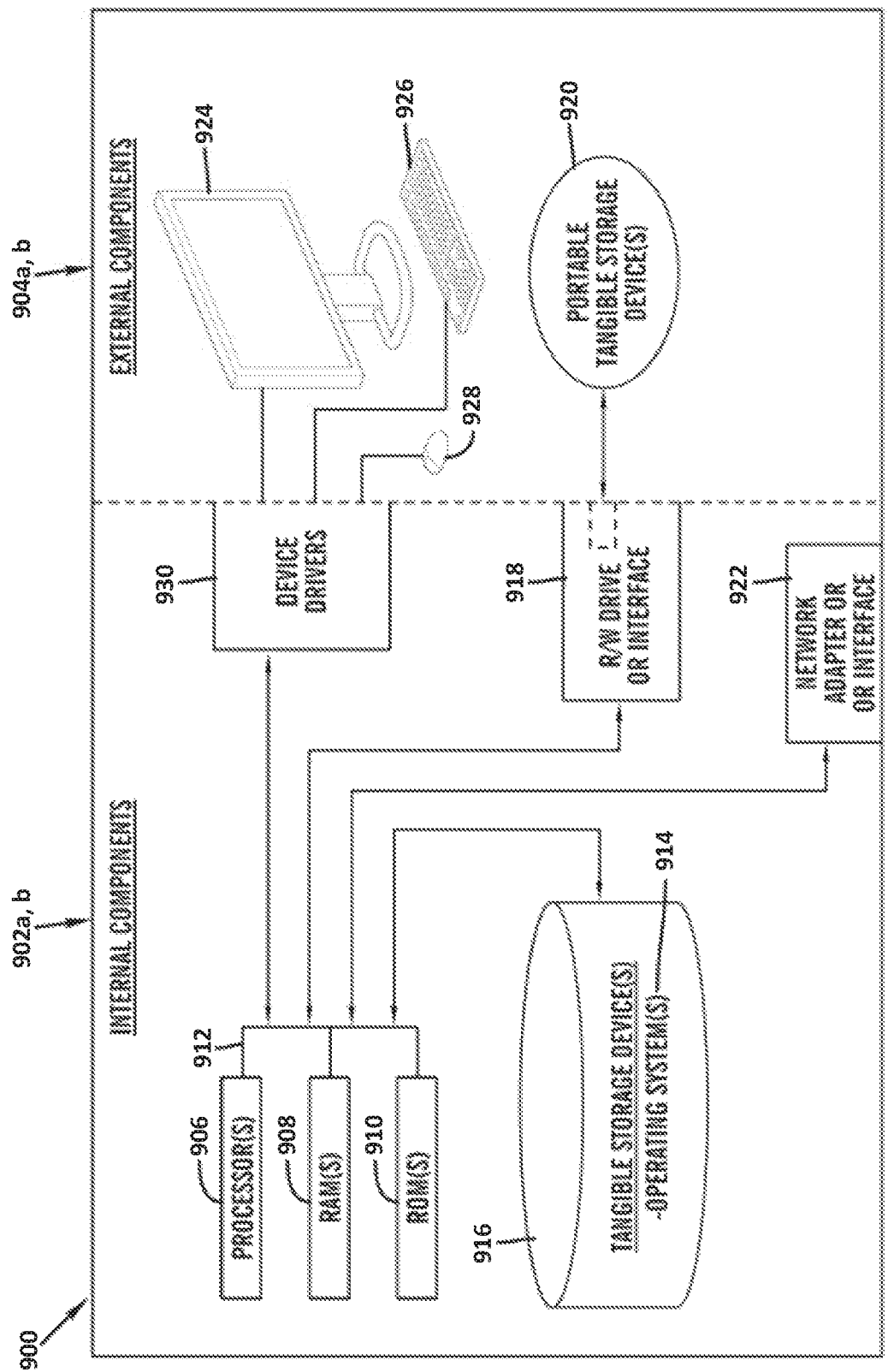
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the factoid answer conversion program 110a in client computer 102, and the factoid answer conversion program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the factoid answer conversion program 110a and 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless Wi-Fi interface cards, or 3G or 4G wireless interface cards or other wired or wireless communication links. The software program 108 and the factoid answer conversion program 110a in client computer 102 and the factoid answer conversion program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the factoid answer conversion program 110a in client computer 102 and the factoid answer conversion program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
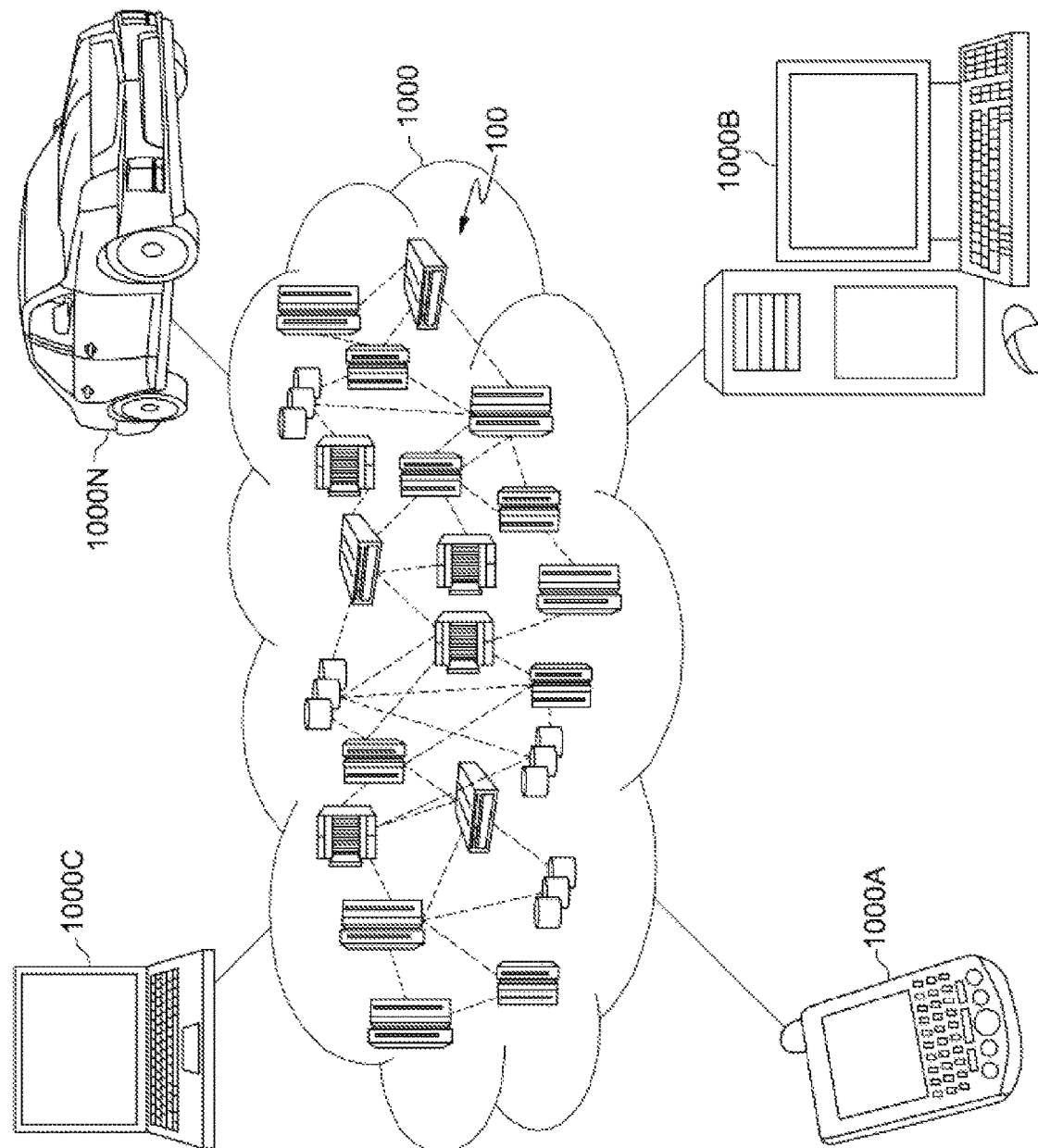
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
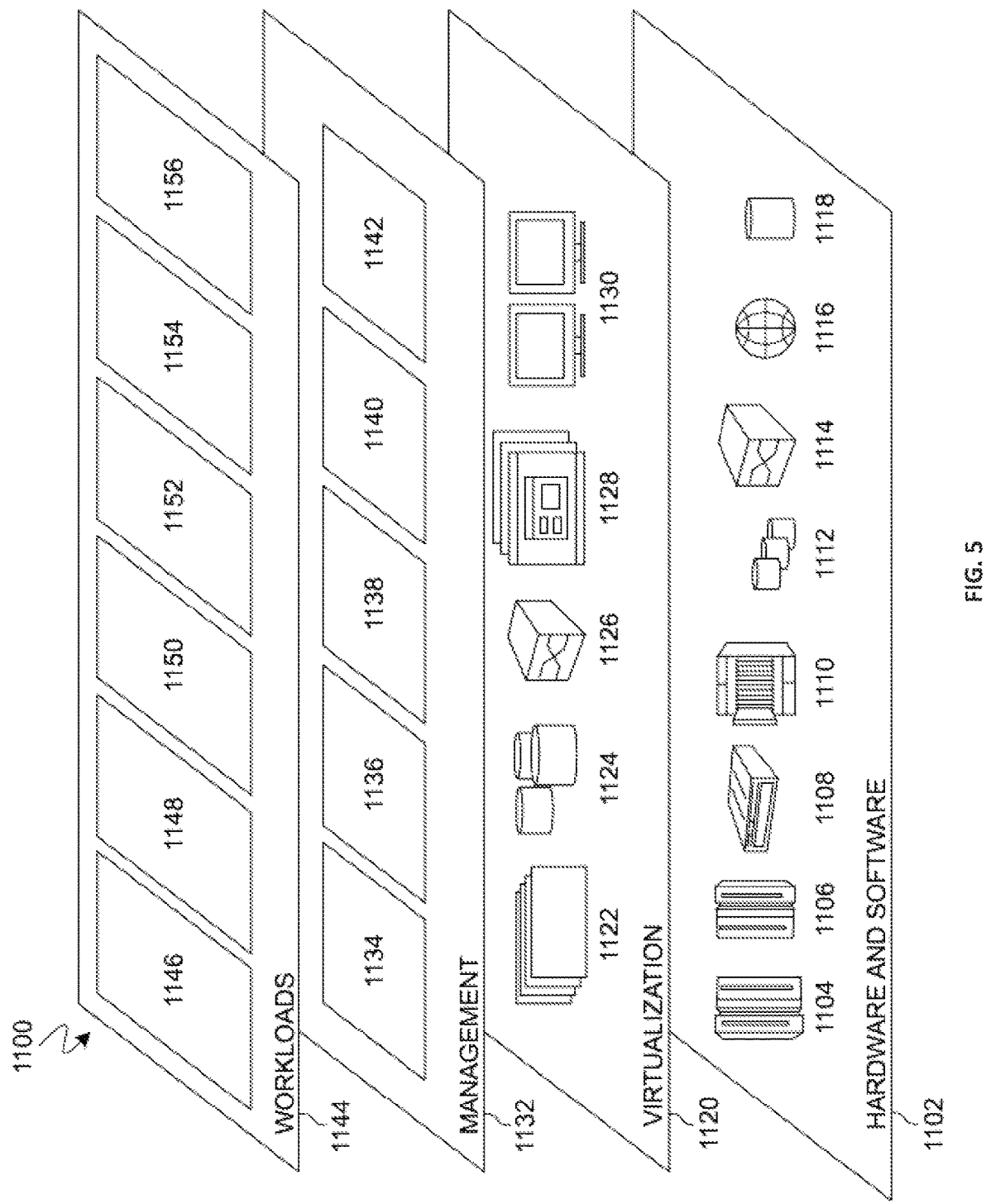
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and factoid answer conversion 1156. A factoid answer conversion program 110a, 110b provides a way to convert factoid answers into structured relations in a knowledge base.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for converting a plurality of factoid answers into a plurality of structured relations for storage in a structured knowledge base, the method comprising:

receiving a query from a user;

generating a plurality of possible factoid answers using an answer generator based on the received query;

determining a plurality of confidence scores for the generated plurality of possible factoid answers using an answer scoring and ranking module;

generating a plurality of certain factoid answers, wherein the plurality of certain factoid answers are selected from the plurality of possible factoid answers that meet a threshold confidence score;

identifying a plurality of special target items in the received query, wherein the plurality of special target items are noun phrases in the received query;

generating a plurality of structured relations for each certain factoid answer generated by the answer generator and the identified plurality of special target items in the received query, wherein each of the plurality of structured relations is labeled with the answer generator that retrieved the certain factoid answer, and wherein the plurality of structured relations include the answer generator in between the identified plurality of special target items and each certain factoid answer, with the identified plurality of special target items on one side of the answer generator and each certain factoid answer on an opposite side of the answer generator; and storing the generated plurality of labeled structured relations into the structured knowledge base as a knowledge graph, wherein the knowledge graph includes a visual expression of the identified plurality of special target items on the one side of the answer generator and each certain factoid answer on the opposite side of the answer generator, wherein the structured knowledge base is adapted to include one or more structured relations of the plurality of structured relations based on whether the received query from the user is related to at least one other query received from the user.

2. The method of claim 1, wherein receiving the query by the user, further comprises:

determining the received query is in the form of a natural language query.

3. The method of claim 1, wherein identifying the plurality of special target items in the received query, further comprises:

generating the identified plurality of special target items from the received query.

4. The method of claim 1, further comprising:

generating a plurality of possible structured relations for each possible factoid answer within the generated plurality of possible factoid answers and each special target item within the identified plurality of special target items; and storing the generated plurality of possible structured relations into the structured knowledge base.

5. The method of claim 4, further comprising:

assessing, in the knowledge base, the determined plurality of possible factoid answers with the corresponding determined plurality of possible confidence scores from the user;

determining a user selected the threshold confidence score for the assessed plurality of possible factoid answers for the received query; and filtering the assessed plurality of possible factoid answers for the received query based on the determined threshold confidence score.

6. The method of claim 5, wherein filtering the determined plurality of possible factoid answers for the received query based on the determined threshold confidence score, further comprises:

determining a plurality of high confidence factoid answers from the determined plurality of possible factoid answers with the corresponding determined plurality of confidence scores that satisfy the determined threshold confidence score;

generating a plurality of high confidence structured relations for each high confidence factoid answer within the determined plurality of high confidence factoid answers and each special target item within the identified plurality of special target items; and storing the generated plurality of high confidence structured relations into the structured knowledge base.

7. The method of claim 5, further comprising:

determining a plurality of low confidence factoid answers from the determined plurality of possible factoid answers with the corresponding determined plurality of confidence scores that are below the threshold confidence score; and removing the determined plurality of low confidence factoid answers from the determined plurality of possible factoid answers.

8. A computer system for converting a plurality of factoid answers into a plurality of structured relations for storage in a structured knowledge base, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

receiving a query from a user;

generating a plurality of possible factoid answers using an answer generator based on the received query;

determining a plurality of confidence scores for the generated plurality of possible factoid answers using an answer scoring and ranking module;

generating a plurality of certain factoid answers, wherein the plurality of certain factoid answers are selected from the plurality of possible factoid answers that meet a threshold confidence score;

identifying a plurality of special target items in the received query, wherein the plurality of special target items are noun phrases in the received query;

generating a plurality of structured relations for each certain factoid answer generated by the answer generator and the identified plurality of special target items in the received query, wherein each of the plurality of structured relations is labeled with the answer generator that retrieved the certain factoid answer, and wherein the plurality of structured relations include the answer generator in between the identified plurality of special target items and each certain factoid answer, with the identified plurality of special target items on one side of the answer generator and each certain factoid answer on an opposite side of the answer generator; and storing the generated plurality of labeled structured relations into the structured knowledge base as a knowledge graph, wherein the knowledge graph includes a visual expression of the identified plurality of special target items on the one side of the answer generator and each certain factoid answer on the opposite side of the answer generator, wherein the structured knowledge base is adapted to include one or more structured relations of the plurality of structured relations based on whether the received query from the user is related to at least one other query received from the user.

9. The computer system of claim 8, wherein receiving the query by the user, further comprises:

determining the received query is in the form of a natural language query.

10. The computer system of claim 8, wherein identifying the plurality of special target items in the received query, further comprises:

generating the identified plurality of special target items from the received query.

11. The computer system of claim 8, further comprising:
generating a plurality of possible structured relations for each possible factoid answer within the generated plurality of possible factoid answers and each special target item within the identified plurality of special target items; and
storing the generated plurality of possible structured relations into the structured knowledge base.

12. The computer system of claim 11, further comprising:
assessing, in the knowledge base, the determined plurality of possible factoid answers with the corresponding determined plurality of possible confidence scores from the user;
determining a user selected the threshold confidence score for the assessed plurality of possible factoid answers for the received query; and
filtering the assessed plurality of possible factoid answers for the received query based on the determined threshold confidence score.

13. The computer system of claim 12, wherein filtering the determined plurality of possible factoid answers for the received query based on the determined threshold confidence score, further comprises:
determining a plurality of high confidence factoid answers from the determined plurality of possible factoid answers with the corresponding determined plurality of confidence scores that satisfy the determined threshold confidence score;
generating a plurality of high confidence structured relations for each high confidence factoid answer within the determined plurality of high confidence factoid answers and each special target item within the identified plurality of special target items; and
storing the generated plurality of high confidence structured relations into the structured knowledge base.

14. The computer system of claim 12, further comprising:
determining a plurality of low confidence factoid answers from the determined plurality of possible factoid answers with the corresponding determined plurality of confidence scores that are below the threshold confidence score; and
removing the determined plurality of low confidence factoid answers from the determined plurality of possible factoid answers.

15. A computer program product for converting a plurality of factoid answers into a plurality of structured relations for storage in a structured knowledge base, comprising:
one or more computer-readable storage medium and program instructions stored on at least one of the one or more tangible storage medium, the program instructions executable by a processor, the program instructions comprising:
program instructions to receive a query from a user;
program instructions to generate a plurality of possible factoid answers using an answer generator based on the received query;
program instructions to determine a plurality of confidence scores for the generated plurality of possible factoid answers using an answer scoring and ranking module;
program instructions to generate a plurality of certain factoid answers, wherein the plurality of certain factoid answers are selected from the plurality of possible factoid answers that meet a threshold confidence score;
program instructions to identify a plurality of special target items in the received query, wherein the plurality of special target items are noun phrases in the received query;
program instructions to generate a plurality of structured relations for each certain factoid answer generated by the answer generator and the identified plurality of special target items in the received query, wherein each of the plurality of structured relations is labeled with the answer generator that retrieved the certain factoid answer, and wherein the plurality of structured relations include the answer generator in between the identified plurality of special target items and each certain factoid answer, with the identified plurality of special target items on one side of the answer generator and each certain factoid answer on an opposite side of the answer generator; and
program instructions to store the generated plurality of labeled structured relations into the structured knowledge base as a knowledge graph, wherein the knowledge graph includes a visual expression of the identified plurality of special target items on the one side of the answer generator and each certain factoid answer on the opposite side of the answer generator, wherein the structured knowledge base is adapted to include one or more structured relations of the plurality of structured relations based on whether the received query from the user is related to at least one other query received from the user.

16. The computer program product of claim 15, wherein program instructions to receive the query by the user, further comprises:
program instructions to determine the received query is in the form of a natural language query.

17. The computer program product of claim 15, wherein program instructions to identify the plurality of special target items in the received query, further comprises:
program instructions to generate the identified plurality of special target items from the received query.

18. The computer program product of claim 15, further comprising:
program instructions to generate a plurality of possible structured relations for each possible factoid answer within the generated plurality of possible factoid answers and each special target item within the identified plurality of special target items; and
program instructions to store the generated plurality of possible structured relations into the structured knowledge base.

19. The computer program product of claim 18, further comprising:
program instructions to assess, in the knowledge base, the determined plurality of possible factoid answers with the corresponding determined plurality of possible confidence scores from the user;
program instructions to determine a user selected the threshold confidence score for the assessed plurality of possible factoid answers for the received query; and
program instructions to filter the assessed plurality of possible factoid answers for the received query based on the determined threshold confidence score.

20. The computer program product of claim 19, wherein program instructions to filter the determined plurality of possible factoid answers for the received query based on the determined threshold confidence score, further comprises:
program instructions to determine a plurality of high confidence factoid answers from the determined plurality of possible factoid answers with the corresponding determined plurality of confidence scores that satisfy the determined threshold confidence score;

program instructions to generate a plurality of high confidence structured relations for each high confidence factoid answer within the determined plurality of high confidence factoid answers and each special target item within the identified plurality of special target items; and program instructions to store the generated plurality of high confidence structured relations into the structured knowledge base.

* * * * *